United States Patent Office 3,577,486
Patented May 4, 1971

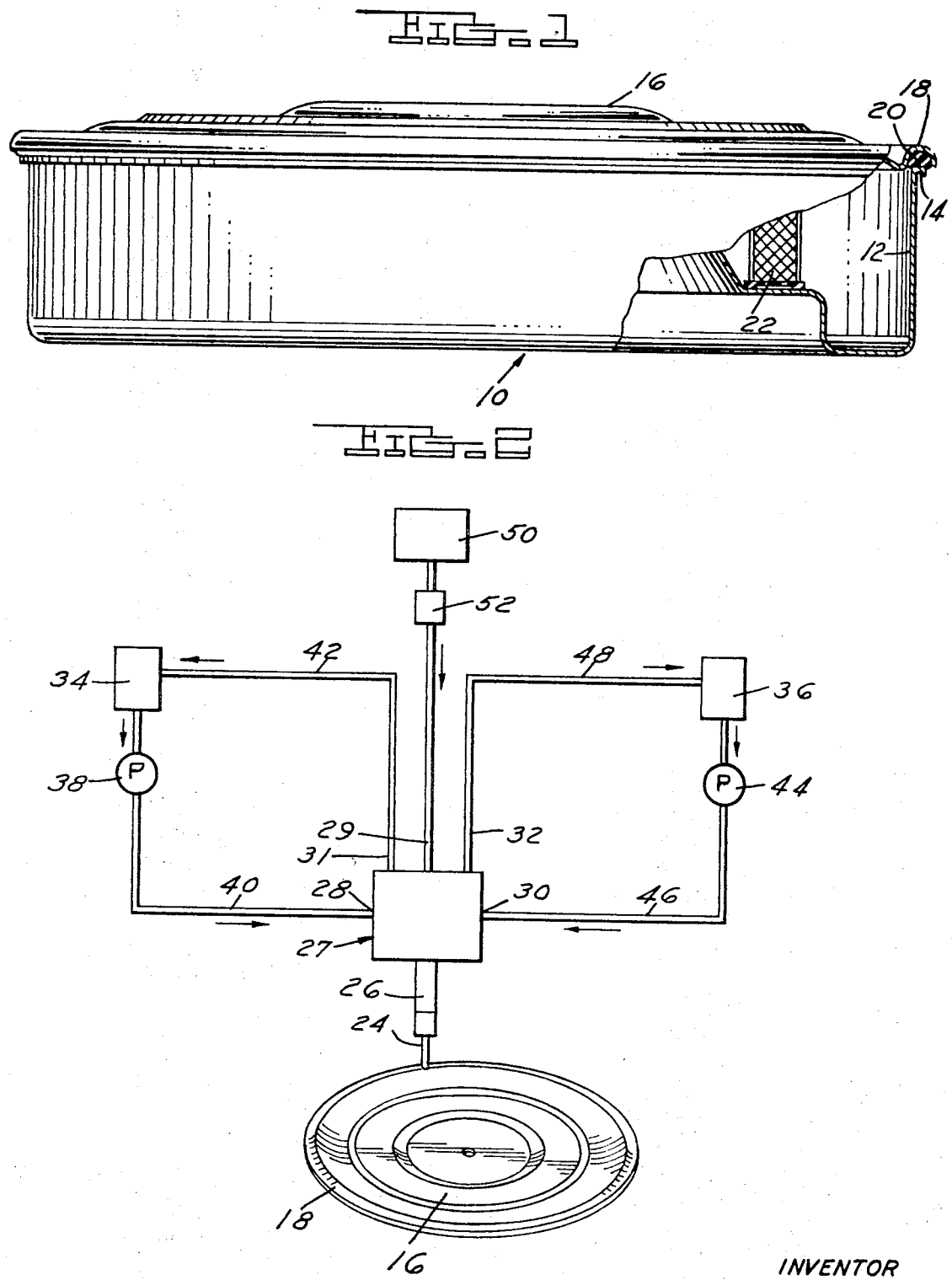

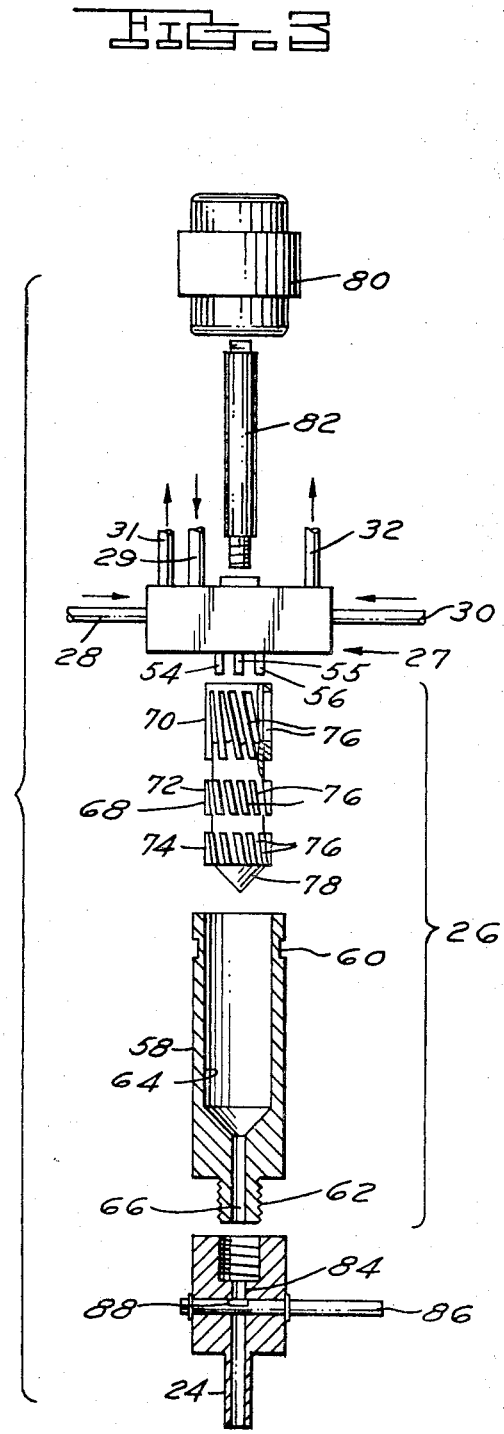

3,577,486
METHOD OF FORMING AN AIR CLEANER SEAL
Joseph B. Sebok, Dearborn Heights, Mich., assignor to Ford Motor Company, Dearborn, Mich.
Filed Sept. 20, 1968, Ser. No. 761,226
Int. Cl. B29d 27/02, 27/04
U.S. Cl. 264—45                6 Claims

ABSTRACT OF THE DISCLOSURE

Liquid curable to elastic polyvinylchloride, polybutadiene or polyurethane is dispensed into a groove near the periphery of an air cleaner cover while the cover is rotating at about one revolution per second through a finite number of revolutions. A subsequent application of heat simultaneously cures the liquid and bonds the resulting seal to the cover.

SUMMARY OF THE INVENTION

For many years, air cleaner covers have been sealed to the air cleaner body by a die cut or extruded elastomeric gasket manufactured by producing the proper length of elastomeric material and bonding the ends of the length to each other. The gaskets were shipped to the automobile assembly plant in large cartons usually containing about 100 units. Invariably the gaskets in the cartons became entangled with each other during shipment; unpacking operations therefore consumed large amounts of time and in some cases necessitated cutting several gaskets to relieve the entanglement.

After a gasket had been unpacked, it was still necessary to bond the gasket to either the air cleaner cover or body before assembling the air cleaner. Attempts to form the gaskets in place on either the air cleaner cover or body failed to acquire commercial success usually because it was impossible to achieve a rapid curing time with a self-leveling liquid capable of producing a seal having the desired properties.

This invention provides a process for dispensing liquid gasket forming materials having a variety of viscosities and leveling properties into a narrow groove on either the air cleaner cover or body with sufficient accuracy and uniformity to produce a good seal. The liquid is dispensed into the groove while rotating the member containing the groove through an integral number of revolutions selected to achieve a balance between the centrifugal forces acting on the liquid and the reduced error resulting from a lack of exact coincidence of the starting and stopping points. Immediately after the dispensing step, the liquid is cured into the desired seal and simultaneously bonded to its associated member.

Forming the groove in the air cleaner cover is desirable since this permits handling the smaller of the air cleaner components during liquid dispensing and curing. Cover rotation speed is extremely critical and must be coordinated with the dispensing equipment capabilities and the fluid properties of the liquid. Rotating the cover too rapidly throws the liquid seal material to the outside of the groove while rotating the cover too slowly makes it difficult to achieve a smooth blend between the starting point and the ending point of the dispensing shot. Groove narrowness and liquid viscosity minimizes any self-leveling properties of the liquid in the vicinity of the starting and ending points so failure to achieve the proper rotational speed results in depressions or high spots under mass production conditions.

Seal materials must satisfy several requirements, one of which is the capability of surviving for useful time periods in the underhood environment. Hardness and deflection properties of the cured seal also must be selected to insure good sealing properties and an ability to absorb manufacturing tolerances in the air cleaner body and cover dimensions. In addition, the dispensed liquid should bond itself to the cover during its curing stage. A two liquid system curable into a foamed polyurethane has been found particularly useful in satisfying these requirements. Small amounts of an inert gas such as nitrogen are added to the liquid components during mixing to provide a uniform cellular structure. Other materials such as polyvinylchloride, polybutadiene, etc., can be used but generally do not have the idealized properties of the polyurethanes.

BRIEF DESCRIPTION OF THE DRAWINGS

FIG. 1 is an elevation view of an air cleaner assembly with a portion of the assembly broken away to show the seal and cover arrangement. FIG. 2 is a schematic view of the equipment used to carry out the process of this invention with a two component polyurethane system. FIG. 3 is an exploded view of the mixing and dispensing equipment used in the FIG. 2 system.

DETAILED DESCRIPTION

Referring to the air cleaner assembly shown in FIG. 1, the air cleaner body 10 has a substantially cylindrical outer wall 12 that has its top edge folded over to form a ledge 14. A substantially circular cover 16 has a shallow groove 18 formed near its outer periphery. Groove 18 contains a foamed polyurethane seal 20 that is bonded to the cover and bears against ledge 14 to seal the cover onto the body. A conventional filter element 22 is held in place between the cover and the floor of the body.

Seal 20 is formed by placing cover 16 on a turntable with groove 18 located below a stationary dispensing nozzle 24 as shown in FIG. 2. Nozzle 24 is connected to a mixing unit 26 that is connected to a valving unit 27. Valving unit 27 has three inlet ports 28, 29, 30 and two recirculating ports 31 and 32, with recirculating port 31 associated with inlet port 28 and recirculating port 32 associated with inlet port 32. The valve assembly described in U.S. Pat. 3,098,506 is particularly useful as valving unit 27.

One component of a two component polyurethane system is stored in a container 34 and the other component is stored in a container 36. A pump 38 and a pipe 40 connect container 34 to inlet port 28 and a recirculating pipe 42 connects recirculating port 31 with container 34. Similarly, a pump 44 and a pipe 46 connect container 36 with inlet port 30 and a recirculating pipe 48 connects recirculating port 32 with container 36. A container of nitrogen gas 50 is connected to port 29 through an appropriate flow regulator 52.

As shown in FIG. 3, valving unit 27 has three outlet ports 54, 55 and 56 closely spaced together on its bottom surface. The cylindrical outer housing 58 of mixing unit 26 fits against the bottom surface of valving unit 27 and surrounds outlet ports 54, 55 and 56. Locking levers (not shown) attached to the bottom of mixing unit 27 fit into a groove 60 near the upper edge of housing 58 and clamp housing 58 to unit 27. Screw threads 62 are formed on the lower portion of housing 58. A cylindrical cavity 64 formed in the upper part of housing 58 tapers inwardly near the lower portion of the housing to a smaller passage 66.

Fitting in cavity 64 is the mixer 68. The exterior surface of mixer 68 has three sections 70, 72 and 74 of vanes 76 angled relative to the rotational axis of mixer 68. Section 70 has an inner cavity communicating with the exterior of mixer 68 through the spaces between the vanes while sections 72 and 74 are solid. Outlet ports 54, 55 and 56 fit inside the cavity in section 70. Mixer 68 terminates at the bottom in a cone section 78. An electric motor 80 is connected to a spindle 82 rotatably mounted in valving unit 27 and threadably engaging mixer 68.

Dispensing nozzle 24 is threaded onto threads 62 of housing 58 so a passage 84 in nozzle 24 communicates with passage 66. A metering bar 86 projects through dispensing nozzle 24 and intercepts passage 84. A notch 88 formed in bar 86 at the interception point permits flow through passage 84 when bar 86 is rotated to one position and stops flow when bar 86 is rotated to another position.

Typical materials capable of producing polyurethane seals having an excellent combination of properties can be purchased from the Reynolds Chemical Company, Ann Arbor, Mich., as RUX 3522; the M&T Chemical Company, Southfield, Mich., as XL 3589A; or the Ren Plastics Company, Lansing, Mich., as DF 126-68. At the beginning of a dispensing run, valving unit 27 is switched into its recirculating position and pumps 38 and 44 are started to begin recirculating the material of containers 34 and 36. Motor 80, which runs at approximately 5000 r.p.m., is started and gas regulator 52 is adjusted to produce the desired flow of nitrogen gas. Typically the gas flow is about 0.03–0.05 cubic feet per hour.

After the materials in containers 34 and 36 have been agitated thoroughly and the proper pressures have been achieved in lines 40 and 46, valving unit 27 is adjusted to apply the material from container 34 to outlet port 54, the material from container 36 to outlet port 56 and the gas from inlet port 29 to outlet port 55. These three components are mixed in the rapidly rotating mixer 68 as the materials flow outward through the spaces between vanes 76 of section 70. Mixer 68 rotates in a clockwise direction so vanes 76 urge the materials downward toward passage 66. The three components are mixed further while flowing between the vanes on sections 72 and 74. Cone 78 smooths the mixed components leaving section 74 and directs the components into passage 66. Bar 86 is controlled by an automatic timer (not shown) so notch 88 is opened for a predetermined time period to flow the mixed materials through passages 66 and 84 and into the groove 18. When bar 86 opens, a similar bar in valving unit 27 stops the recirculation of the two components and connects inlet ports 28, 29 and 30 to outlet ports 55, 56 and 57.

The turntable rotates at a constant speed carefully selected according to the properties of the material. With the materials identified above, rotating the turntable through 3–6 revolutions during the dispensing step produces good seals at a rate suitable for mass production. In a typical operation, dispensing is carried out for 4.5 seconds while rotating the covers through 4 revolutions. About 40 grams of material are dispensed into a groove about ½ inch wide on a cover having a 9-inch radius during this time period.

Immediately after the dispensing operation the cover is placed in an oven for about 10 minutes at 260° F. The resulting seal is about 0.40 inch deep and has a hardness on the shore 00 scale of about 50–60. A fine cell structure is achieved in the seal which can deflect by an amount in excess of 0.17 inch under the normal assembly load of about 150 pounds.

Thus this invention provides a process for producing a seal for the cover of an air cleaner assembly in a rapid and efficient manner. Seals made from foamed polyurethane according to the process bond readily to the cover and have an excellent combination of properties particularly suited to the underhood environment.

I claim:
1. In the manufacture of a carburetor air cleaner having a body member and a cover member, a process for sealing the cover member to the body member comprising
   forming a substantially circular groove near the edge of one of said members,
   preparing a pumpable polymeric material capable of curing into an elastic polyurethane, polyvinylchloride, or polybutadiene,
   pumping a uniform amount of said polymeric material into said groove while rotating the member containing the groove through a plurality of revolutions at a rotational speed of about one revolution per second, the material pumped into the groove during subsequent revolutions flowing into the material pumped into the groove during previous revolutions to form an integral mass of polymeric material in the groove,
   curing the polymeric material into an elastic seal adhering to the member containing the groove after the pumping step is complete, and
   assembling the member containing the cured elastic seal to the other member so the seal bears against the other member.

2. The process of claim 1 comprising rotating the member containing the groove through 3–6 revolutions during the dispensing step.

3. The process of claim 2 in which the cured seal is a foamed polyurethane made from two components and comprising mixing said components with a gas just prior to dispensing the mixture into said groove.

4. The process of claim 3 comprising pumping the two components into the upper portion of a cylindrical mixing member having angled vanes on its exterior surface, rapidly rotating said mixing member in a direction such that said angled vanes mix the components and urge the mixed components toward the lower portion of the mixing member, and controlling the flow of the mixed components into the groove by a valve mechanism communicating with said lower portion.

5. The process of claim 4 in which the upper portion of the mixing member contains a cavity communicating with the exterior of the member through spaces between said vanes and in which the two components are pumped into said cavity.

6. The process of claim 5 comprising smoothing the mixed components with a tapered cone section at the lower portion of the mixing member as the mixed components are guided toward said valve mechanism.

References Cited

UNITED STATES PATENTS

| | | | |
|---|---|---|---|
| 1,427,133 | 8/1922 | Taliaferro | 264—45X |
| 1,918,127 | 10/1930 | Pfeiffer | 264—310X |
| 2,597,448 | 5/1952 | Carothers | 264—310X |
| 2,948,928 | 8/1960 | Edneth | 264—54X |
| 3,202,307 | 8/1965 | Rainer | 264—45X |
| 3,232,709 | 2/1966 | Cole | 260—2.5AUX |
| 3,366,718 | 1/1968 | Komada | 264—54X |
| 3,377,411 | 4/1968 | Charvat | 264—45 |
| 3,442,411 | 5/1969 | Mahoney | 264—45X |

JULIUS FROME, Primary Examiner

P. A. LEIPOLD, Assistant Examiner

U.S. Cl. X.R.

55—502, 510; 264—54, 308, 310